UNITED STATES PATENT OFFICE.

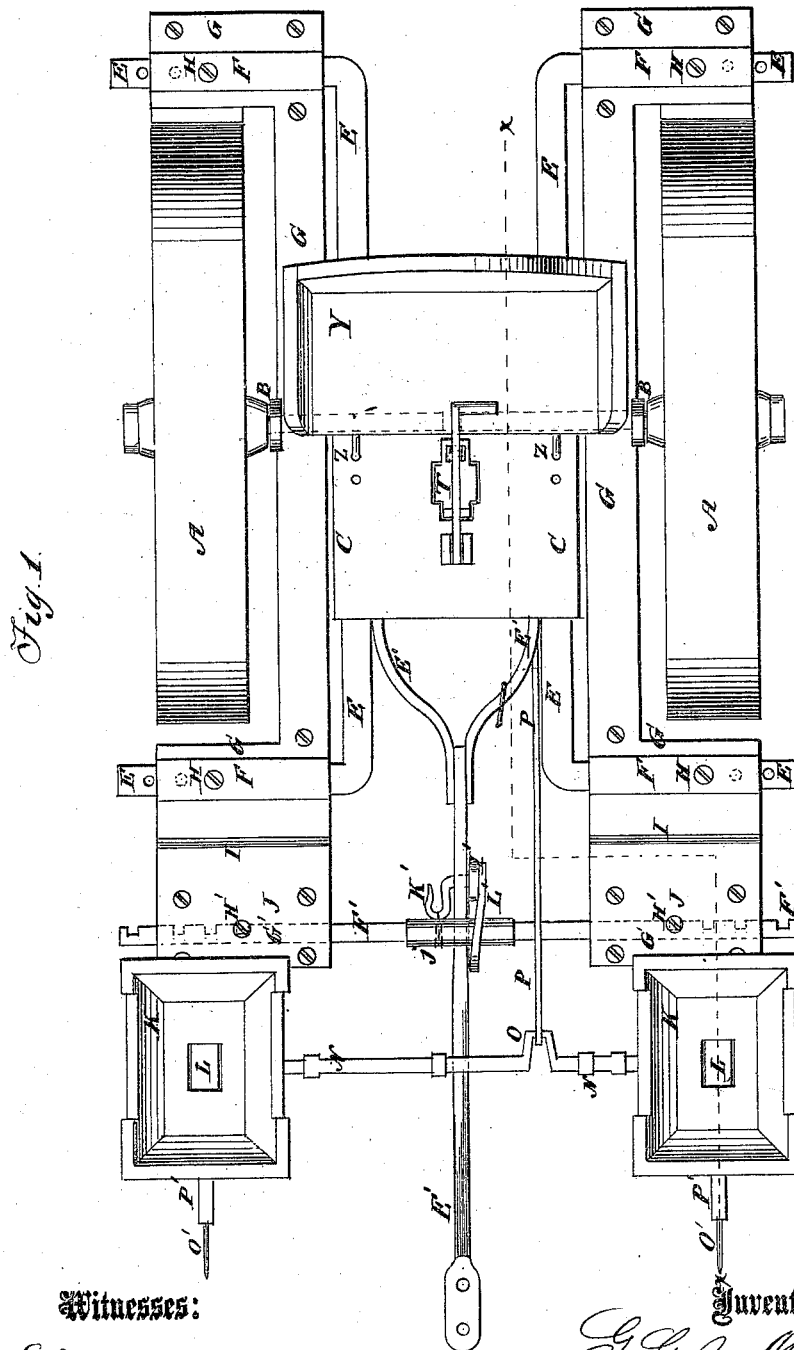

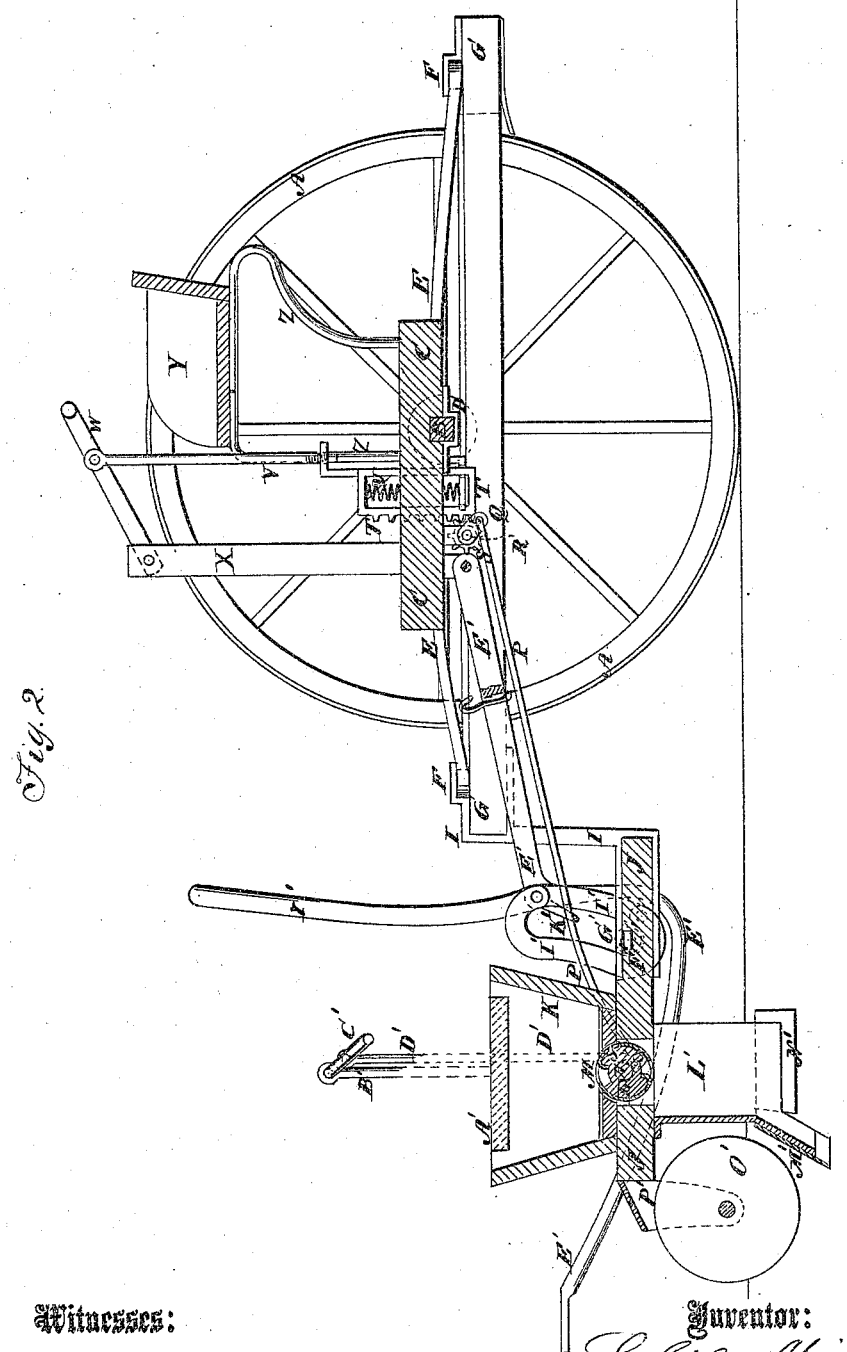

GEORGE G. J. MILLAR, OF LOCKBOURNE, OHIO.

IMPROVEMENT IN CORN-PLANTERS.

Specification forming part of Letters Patent No. 130,653, dated August 20, 1872.

Specification describing a new and useful Improvement in Corn-Planter, invented by GEORGE G. J. MILLAR, of Lockbourne, in the county of Franklin and State of Ohio.

Figure 1, Sheet I, is a top view of my improved corn-planter. Fig. 2, Sheet II, is a detail vertical longitudinal section of the same taken through the line $x\ x$, Fig. 1.

Similar letters of reference indicate corresponding parts.

My invention has for its object to furnish an improved corn-planter which may be adjusted to plant the rows of hills at any desired distance apart, and to drop any desired number of kernels to a hill, and which shall at the same time be simple in construction, convenient in use, and effective and reliable in operation; and it consists in the construction and combination of various parts of the machine, as hereinafter more fully described.

A are the wheels, which are made larger and with wider rims than usual to prevent them from sinking into the plowed ground, and to adapt them to serve as rollers for pressing the soil down upon the seed. The wheels A revolve upon the journals of short axles B, the bodies of which are made square to prevent them from turning in their keepers. C is the platform, to the under side of which is attached a keeper, D, which is so formed as to receive and fit upon the square inner parts of the axles B. The connection between the axles B and platform C is further strengthened by the iron bars E, attached to the under side of the side edges of the platform C, and the middle parts of which are bent four times at right angles to pass around and fit upon the said axles B. The ends of the bars E are bent outward at right angles to pass through and fit into the sockets F, formed in or attached to the bars G, which are rigidly attached to the axles. The end parts of the bars E are secured in the sockets F of the bars G by pins, bolts, or screws, H, which pass through holes in the said sockets and bars. The end parts of the bars E have several holes formed in them to receive the pins, bolts, or screws H, so that by removing the said pins, bolts, or screws H the bars E and wheels A may be moved from or toward the platform C to adjust the machine to plant the rows of hills wider apart or closer together, as may be desired. To the forward ends of the bars G are attached plates or castings I, which project downward, and the lower ends of which are attached to the rear ends of the boards J. The plates or castings I may be strengthened by rods, if desired. The outer sides of the bars G are recessed to receive the wheels A, to bring said wheels into line with the seed-hoppers K attached to the forward parts of the boards J, as shown in Fig. 1. L are the dropping-wheels or cylinders, in the faces of each of which is formed one or more holes to receive the seed and carry it out of the hopper K. The faces of the dropping-cylinders are covered with tubular sheet-iron cases, M, in which, directly opposite the holes in the cylinders L, are cut holes corresponding in shape and size with the holes or cups in the said cylinders L. The pieces cut out of the case are left fast to the cases M upon one side, and are bent inward to enter the holes or cups in the cylinders L, so that, by moving the cases M upon the cylinders L, the capacity of the said holes may be increased or diminished, according to the number of seeds to be dropped at a time. The cases M are secured in place upon the cylinders L, when adjusted, by a screw which passes through a slot in the said cases and enters the said cylinders, as shown in Fig. 2. The dropping-cylinders L M are placed in recesses in the boards J and in the bottom of the hoppers K, as shown in Figs. 1 and 2, so as to receive the seed from the said hoppers and discharge it upon the ground. The cylinders L M are attached to the outer ends of the rod or shaft N, which is made in parts, sliding upon each other, so that its length may be extended or contracted as the machine is adjusted to plant the rows of hills wider apart or closer together. Upon the shaft N is formed a crank, O, to which is pivoted the end of a connecting-rod, P, which extends back beneath the platform C, and its rear end is pivoted to a short crank, Q, formed upon the end of a short shaft, R, which works in bearings attached to the under side of the said platform C. To the crank-shaft Q R is attached a small gear-wheel, S, the teeth of which mesh into the teeth of the rack-frame T, which passes up through a hole in the platform C and works up and down in guides or ways attached to said platform. Upon the upper end of the frame T is formed a step so that the rack-frame T may be pushed down.

to operate the dropping-cylinders and drop the seed by the driver with his foot. As the downward pressure is removed from the frame T the said frame is raised, to turn the cylinders L M back to empty the full cup and to again receive seed in the empty cup, by the spring U, the lower end of which rests upon a support attached to the platform C, and its other end presses against the top of the said frame T, as shown in Fig. 2. To the top of the frame T is attached the lower end of a rod, V, the upper end of which is pivoted to the crank W, which is pivoted to the upper end of a standard, X, the lower end of which is attached to the platform C. By this device a person sitting upon the driver's seat Y can operate the dropping-cylinders by hand. The driver's seat Y is adjustably supported from the platform C by the supports Z, so that it may be moved back or forward to enable the driver to balance the machine with his weight, thus relieving the horses' necks. When it is desired to have the driver sit upon the forward part of the machine, a board, A', is laid upon the tops of the seed-hoppers K, to which board is attached a standard, B', to the upper end of which is pivoted a double crank, C', to which is pivoted the upper end of a connecting-rod, D', which passes down through a hole in the board A', and its lower end is pivoted to the crank O, so that the seed may be dropped by operating the crank C'. E' is the rear or iron part of the tongue, the rear end of which is forked, and is pivoted to the platform C. The part E' of the tongue is made in about the form shown in Fig. 2, and to its forward end is designed to be bolted the other or wooden part of said tongue. The boards J, to which the hoppers K are attached, are secured at the proper distance apart by the cross-bar F', the ends of which are inserted in sockets G' formed to receive them in, or attached to the boards J. The bar F' is secured in the sockets G', when adjusted by pins, bolts, or screws H', several holes being formed in the bar F' to receive the pins, bolts, or screws H'. I' is a lever, which is pivoted to the rear part E' of the tongue, and the lower part of which is slotted to receive the cross-bar F', so that by operating the said lever I' the forward part of the planter may be raised from the ground for convenience in turning or passing from place to place. The slot in the lever I', which may be formed by attaching a separate piece to the lower part of said lever, is designed to prevent the machine from tipping over backward when its forward part is raised from the ground. The forward part of the machine is kept from dropping down too low, and thus planting the seed too deep, by a chain, J', which is passed around the cross-bar F' and hooked upon the hook K' formed upon the head of the bolt that pivots the lever I' to the part E' of the tongue. By this construction, by taking up and letting out the chain J', the machine may be adjusted to plant the seeds at any desired depth in the ground. L' are the plow-standards, which are made hollow to adapt them to serve as spouts for conducting the seed to the ground, and the upper ends of which are secured to the lower side of the boards J. To the forward side of the lower ends of the hollow standards L' are attached the plow-plates M' for opening the furrows to receive the seed, and which are detachably secured to said standards by two bolts, so that they may be removed when desired. To the sides of the lower ends of the standards L' are secured, in an inclined position, the plates N', by which the seed is covered. The covering-plates N' are secured by a single bolt, so that they may be set back or forward, according to the amount of soil desired to be drawn over the seed. O' are circular revolving cutters, which are pivoted to supports P' attached to the forward ends of the boards J, so that the revolving cutters may be in the space between the end of the boards J and the points of the plows M'. The cutters O' are designed to cut off any stalks or other rubbish that may be upon the ground, and which might affect the proper operation of the plows. The cutters O' should be provided with shields or guards to prevent them from injuring or being injured by the horses' legs or other objects with which they might come in contact.

Having thus described my invention, I claim as new and desire to secure by Letters Patent—

1. The combination of the wheels A, short axles B, platform C, keeper D, bars E, bars G, and cross-bar F' with each other, to adapt the planter to be expanded or contracted, substantially as herein shown and described, and for the purpose set forth.

2. The combination of the castings or plates I, boards J, seed-hoppers K, dropping-cylinders L M, and extension crank-shaft N O with the expanding and contracting framework of the machine, substantially as herein shown and described, and for the purpose set forth.

3. The combination of the rod V and crank-lever W with the toothed rack-frame T, spring U, gear-wheel S, shaft R, crank Q, connection-rod P, and crank O of the extension shaft N that operates the dropping-cylinders, substantially as herein shown and described, and for the purpose set forth.

4. The slotted lever I', constructed substantially as herein shown and described, in combination with the iron part E' of the tongue, and with the adjustable cross-bar N, substantially as herein shown and described, and for the purpose set forth.

GEORGE G. J. MILLAR.

Witnesses:
  L. D. BUTTLES,
  PATTERSON HARRISON.